United States Patent [19]
Marwick

[11] Patent Number: 4,775,120
[45] Date of Patent: Oct. 4, 1988

[54] EXTRATERRESTRIAL TRANSPORTATION APPARATUS AND METHOD

[76] Inventor: Edward F. Marwick, 5149 W. Dobson St., Skokie, Ill. 60077

[21] Appl. No.: 588,711

[22] Filed: Mar. 12, 1984

Related U.S. Application Data

[63] Continuation-in-part of Ser. No. 137,849, Apr. 7, 1980, Pat. No. 4,436,695.

[51] Int. Cl.$^4$ ................................................ B64G 1/10
[52] U.S. Cl. .................................... 244/158 R; 244/63
[58] Field of Search ................. 244/158 R, 63, 110 R, 244/110 D, 110 E, 113; 73/167; 188/266, 268, 269, 279

[56] References Cited

U.S. PATENT DOCUMENTS

| | | | |
|---|---|---|---|
| 2,395,405 | 2/1946 | Goddard | 244/110 E |
| 2,592,873 | 4/1952 | Driskill | 244/110 E |
| 2,812,660 | 11/1957 | Marden et al. | 73/167 |
| 2,813,422 | 11/1957 | Schuessler | 73/167 |
| 3,678,745 | 7/1972 | Teng | 73/167 |
| 3,718,041 | 2/1973 | Jones et al. | 73/167 |
| 3,940,981 | 3/1976 | Covey et al. | 73/167 |

OTHER PUBLICATIONS

"The Capture of Lunar Materials Ejected into Deep Space", Dr. M. Abo-El-Ata, presented at the Special Session of the Seventh Annual Lunar Science Conference on Utilization of Lunar Materials and Expertise for Large Scale Operations in Space, Mar. 16, 1976.

Primary Examiner—Trygve M. Blix
Assistant Examiner—Rodney Corl

[57] ABSTRACT

Greatly reduced cost of extraterrestrial transporation of strong items and materials is obtained through the use of impact into a crash-capturing-containing facility for deceleration. Cargoes from both the Earth and Moon can be cheaply crash-transported to a low earth orbit crash-load-capturing-satellite so that the satellite maintains a somewhat constant low earth orbit. By crash-capturing only lunar materials, the crash-containing satellite can also become a cargo-transporting satellite that travels from low earth orbit and delivers a much greater quantity of materials to a higher earth orbiting station that it started with. By crash-capturing only retrograde highly elliptically orbiting lunar material, that cargo-transporting satellite can be moved from a high earth orbit back to a low earth orbit.

33 Claims, 5 Drawing Sheets

FIG_1

FIG_2

FIG_3

FIG_4

FIG-3

FIG_5A

FIG_6

FIG_7

FIG_10

FIG_11

EXTRATERRESTRIAL TRANSPORTATION APPARATUS AND METHOD

This is a continuation-in-part of U.S. patent application Ser. No. 137,849, filed Apr. 7, 1980, and now U.S. Pat. No. 4,436,695, issued Mar. 13, 1984.

This invention relates to extraterrestrial transportation and, more particularly to a method and apparatus whereby spaceships, satellites, fabricated structures, and/or equipment may be used for the cheap transport of lunar materials to extra-lunar locations and for the cheap transport of items and materials from Earth to extraterrestrial locations.

There are a great number of simple materials and many manufactured items which can withstand decelerations on the order of several thousand times Earth's gravity. In accordance with this invention, various structures are used for containment of "captures" such that the substances and items so captured may be recovered at a significantly lower cost than would be required for "soft landing" such cargoes. The main reason for much cheaper transportation by the practice of this invention is that with the practice of this invention almost no fuel or energy is expended in "soft landing" or soft docking the materials or items being shipped.

The large scale industrialization of space requires much cheaper means to transport materials and supplies from Earth to low earth orbit, from very high earth orbit to the Moon, and from the Moon to low earth orbit. Space industrialization includes processing and manufacturing of objects in space, including special biological products and non-biological items such as special crystals and hollow ball bearings. Also, very large facilities for communications and for broadcasting as well as solar power satellites may be constructed.

The present invention provides much cheaper means of transportation from Earth to earth orbit, from distant earth satellites to earth orbit, and from distance earth orbiting satellites to the Moon of such materials and supplies that can withstand decelerations of many thousands of gravities. Also disclosed is a method of transporting materials, supplies, and fragile items from low earth orbit to higher orbits or from such higher orbits to lower earth orbits.

Prior to or concurrently with the practice of this invention, it may be desirable to do the following:

(1) Build a large low earth orbiting space station (more than a storage depot) including a facilities for the fabrication of spaceships, space tugs, and large structures and which can be use items and materials cannibalized from spent rockets in the construction process. It is probably best that this earth orbit crash satellite-base be in an orbit that is in or near the plane of the earth's equator.

(2) Explore the Polar regions of the Moon for water. While it is assumed that some $H_2O$ does exist on the Moon possibly in the form of hydrates and/or as a permafrost, even if such water does not exist on the Moon, the industrialization of space still is possible but at much greater expense. Thus, the present invention could still be practiced. Without water on the Moon, the colonization of the Moon by large numbers of people would likely become too expensive, but most of the work in building and operating the large facilities for the export from the Moon of much lunar material could be handled effectively by robots, automated equipment, and machinery controlled electronically from Earth.

(3) Improve Earth to low earth orbiting rockets and have them cannibalizable, and somewhat redesign the shuttle.

(4) Build bases at L-1 (the first Lagrangian Libration Point, a distance of about 58,000 km from the Moon, in a direction toward the Earth) and in very low lunar orbit. For such bases at the L-1 location of the Earth-Moon system and in very low orbit about the Moon could serve as supply bases for cryogenic gases and for other supplies. For the storage of cryogenic gases, such as hydrogen and oxygen, there needs to be refrigeration means which could operate from electricity obtained from sources such as solar cells and nuclear reactor systems. Great savings in fuel consumed can be obtained by the use of such bases for the large scale transport of workers, equipment, and supplies to the Moon.

It is likely that the prime purpose of the building of a base or bases on the Moon will be for the construction of facilities that cause and/or aid the export from the Moon or large quantities of lunar materials. Details of construction and operation of such facilities will not be described herein for the literature currently contains many pertinent papers discussing this technology, such as *The Proceedings of the Sixth Conference on Space Manufacturing* (Princeton, May 1983) released in the American Astronautical Society's series, *Advances in the Astronautical Sciences*.

A significant aspect of this invention is the capture-containment of cargo-loads in a chamber. Such a chamber can be on a massive solid astronautical body that lacks much of an atmosphere, such as the Moon, or the chamber can be part of a man-made satellite. Also, such a chamber could be long and narrow and be in a facility where the incoming packaged-load is decelerated over a distance of hundreds of meters or the chamber could have a large end porton which is somewhat spherical in shape and where most of the deceleration takes place as the crash-load hits a massive fluid glob or cluster of globs near the center of the large end portion.

Where it is desired that the objects being collision-transported be undamaged by the impact, such as required for food and manufactured items, it is best if deceleration occurs over a long distance and is at a more or less constant rate. For collision-transporation, a very long narrow crash-chamber is preferred.

Where there is a high probability of an explosive release of gas, such as when a thinly packaged mass of cryogenic material like liquid hydrogen is crash-transported, it is preferable to have a collision with a massive fluid glob towards the center of a large somewhat spherical chamber. There is no reason to have a long decelerating section before the massive glob. Likewise, collision with a glob may be preferably when the material being crash-transported is not a manufactured item or something like food which needs protective and/or separate packaging. For example, if the material being collision-transported is some special lunar soil, even the most rapid deceleration will not likely alter the material in a manner that is unacceptable.

For the building of the lunar base, many pieces of equipment, apparatus, and supplies capable of withstanding the deceleration forces which are of several thousand gravities must be delivered to the Moon. Soft-landing of these cargoes would require much additional fuel to slow down the landing ship and additional fuel to return the landing ship to its base. By constructing crash catching facilities on the Moon, the maximum deceleration can be made low enough so that the suitably packaged cargo is able to be crash-landed without damage. The outer parts of the packing of the cargo become useful scrap while the inner packaging materials could be useful materials for fuels and other purposes.

For example, plastics contain carbon and hydrogen. By electro-chemical processing, such carbon and hydrogen may be converted into $C_2H_2$ which is useful as a fuel with an over-supply of oxygen. Also, such metals as aluminum or magnesium may be used in powder form in a rocket that is oxygen-rich. Note that there is plenty of oxygen on the Moon in the form of oxides.

A reuseable rocket is attached to a packaged-load for directing the packaged-load to a long decelerating-chamber on the Moon. The rocket separates from the packaged-load before impact and the packaged-load enters the chamber, is decelerated, and then withdrawn therefrom. The long chamber preferably has three shutter-doors which quickly open and close to prevent substantial loss of working fluid. The packaged-load is first decelerated by collision with a fluid spray, the dispensing of which that is so programmed that the spray becomes denser as the packaged-load travels further into the decelerating-chamber. Then the packaged-load collides with a plurality of thin column-globs which become progressively thicker. Finally, the packaged-load collides with a pool of liquid in which it stops.

In an alternate embodiment, a low earth orbiting crash-load capturing satellite is designed to crash-capture crash-loads from the Earth and also from the Moon. This low earth orbit crash satellite may be tethered to an upper space station of about equal mass some 200 km higher so that there is an artificial gravity in the form of a net downward force within the large crash-containing chamber of the low earth orbit crash satellite of about 4% of an Earth gravity (about 0.40 newtons per kilogram of mass). On the Moon, the net downward force due to the Moon's gravity is about 1.6 newtons per kilogram of mass.

This design is of a low earth orbiting crash satellite which is designed to capture different types of packaged-loads including liquid hydrogen where the velocity of entry is over three times the velocity of entry into the accelerating-chamber on the Moon and the kinetic energy per kilogram of mass is about ten times as much. The crash-load containing liquid hdyrogen bursts and the resulting hydrogen gas is contained within the chamber. Then the hydrogen gas is evacuated from chamber and at the instant the shutter-doors are next opened the gas pressure within the crash-containing chamber is less than a millimeter of mercury.

To compensate for the loss of velocity of the low earth orbit crash satellite about the Earth resulting from the capture of crash loads from the Earth, the low earth orbiting crash satellite captures crash-loads of lunar material that are traveling in highly elliptical orbits in the same direction and at the instant of collision have an entry velocity of about 3.2 km/second. The low earth orbiting crash satellite either has to be turned about 180° or have both front and rear openings to capture lunar material traveling in the same direction as is the low earth orbiting crash satellite.

Since it takes only one-sixteenth as much energy to raise a mass straight up some 200 km above the earth as it does to place the same mass in orbit some 200 km above the earth's surface, there is a great saving in costs by shipping materials into orbit this way. Taking into account such factors as the need to use multistage rockets, the higher air resistance losses, and the need for more insulation of a hydrogen-load, the cost of shipping hydrogen into low earth orbit by this method may be as low as about one-thirtieth the cost of shipping hydrogen to a low earth orbit base by orbiting and soft-docking.

In another embodiment, a low earth orbiting crash satellite uses a crash pile which is assembled of large scrap pieces is used for the capture of crash-loads. The crash pile is held together by assembling the large scrap pieces together by any convenient means, such as tying the scrap pieces with wires. Upon impact, the crash-load is fragmentized. For this embodiment the use of crash-loads are preferably of solid materials from the Moon or Earth.

The crash pile is of significant mass so that the change in momentum resulting from deceleration of the packaged-load would cause only a small change in velocity of the outer portions of the scrap pile. Portions thereof may separate and could be reconnected between arrival of successive packaged-loads by workers in the crash satellite who could be also remove materials from the chamber for processing.

A further embodiment of this invention provides a method by which a low earth orbiting crash satellite can be converted to a variable earth orbiting crash-capturing satellite to serve as a cargo-carrying orbital transfer vehicle.

This requires at least one base on the Moon from which materials can be transported to a location or locations off the Moon. These materials are fabricated into crash-loads which are then launched into an orbit which will cause them to intersect with an orbiting crash satellite. Note that there is great flexibility in the locations and the means of transportation and launching.

The locations from which crash loads are launched, and the earth orbiting capturing-containing satellites are both preferably in the plane of the Earth's equator. That means that the crash-loads or the materials from which crash-loads will be made have an orbital transfer from an orbit which is in the plane of the Moon's orbit about the Earth to an orbit which is in the plane of the Earth's equator.

One possible way to launch the packaged-loads is to use a mass-driver on the Moon to transport lunar material to a catcher-means about the L-2 Lagrangian Libration Point of the Earth-Moon system, located more than 60,000 km from the Moon in a direction away from the Earth; to fabricate said crash-loads at a base, about L-2; to transport said packaged-loads to super-high earth orbiting bases which may have nearly circular orbits about the Earth with orbital radii in excess of 1,000,000 km and in the plane of the Earth's equator.

Each of a plurality of such high earth orbit transfer satellites preferably has at least one launcher based thereon which places the packaged-load with an attached adjuster into an orbit that has a perigee that almost intersects the orbit of the low earth orbit crash satellite at the instant planned for a collision. The launcher burns hydrogen with oxygen and returns to the high earth orbit transfer satellite after about a couple of hours for refueling, inspection, and reloading.

The adjuster, as controlled by a complex radar-computer-communications system that is mostly on the low earth orbit crash satellite, so adjusts the path of the packaged-load that there is a programmed contained-crash with the low earth orbit crash satellite. Just before the crash, the adjuster separates from the packaged-load and quickly blasts itself out of a collision path with the low earth orbit crash satellite. Then the adjuster returns to a high earth orbit crash satellite for refueling, inspection, and reloading. At any time, thousands of assembly and separated adjusters and crash-loads could be in motion.

For their trip of several weeks, the adjusters could use storable non-cryogenic liquids for fuel and oxidizer. The fuel could be $N_2H_4$ or some hydrocarbon while an oxidizer such as $HNO_3$ or $N_2O_4$ could be used. These fuels and oxidizers could be manufactured in space from nitrogen, ammonia, or methane that has been crash-transported to the low earth orbit crash satellite from Earth.

A principal advantage in the use of a plurality of high earth orbit crash satellites bases rather than a single base at L-2 is that the use of high earth orbiting bases produces a saving of almost two-thirds of the fuel needed for launchers and adjusters since much less fuel is needed to transfer a packaged-load from a high earth orbiting base to a low earth orbit crash satellite colliding orbit than to transfer that same packaged-load from L-2 to a low earth orbit crash satellite colliding orbit.

A better understanding of this invention will be gained when the following detailed description is read in conjunction with the appended drawings, wherein.

Figure 1:
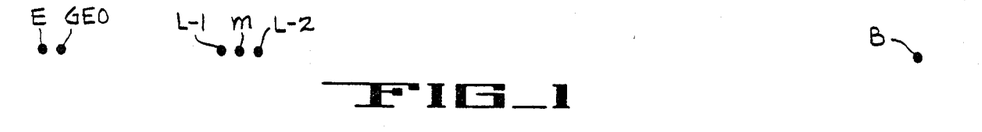
FIG. 1 is a one-dimensional drawing showing the relative location of the Earth, geo-stationary orbit, L-1, the Moon, L-2, and a high earth orbiting base.

Referring now to the drawings, FIG. 1 illustrates the relative distances between the Earth and the orbits of L-1, the Moon, L-2, a high earth orbiting base B, and geo-stationary orbit GEO.

Figure 2:
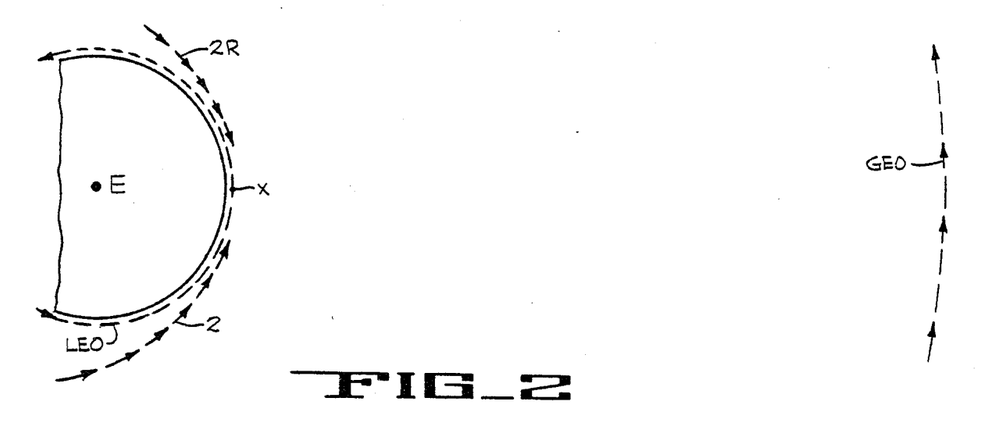
FIG. 2 illustrates the relative location of the Earth, low earth orbit, and geo-stationary orbit.

FIG. 2 shows, in plane of the Earth's equator, relative distances between the surface of the Earth E, a low earth orbit LEO of about 400 km altitude, and a geo-stationary orbit GEO. Also shown is a preferred path 2 which a packaged-load from a high earth orbiting base would take before its collision with a low earth orbit crash satellite at a point X. Path 2R is a retrograde course for a collision at point X. Note that a low earth orbit of 200 km altitude would be twice as close to the surface of the earth.

Figure 3:
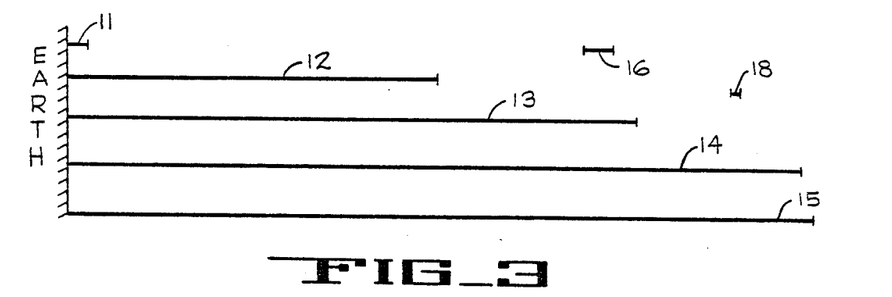
FIG. 3 is a graph showing the relative energy needed for different trips from earth into space and for different orbital changes.

The relative energies needed to move a unit mass from Earth are shown in FIG. 3. Line 11 is the energy expended to a point straight up some 200 km; line 12 shows the energy from Earth to low earth orbit; line 13 illustrates Earth to geo-stationary orbit; line 14 from Earth to L-1 or the Moon by a crash landing; and line 15 the energy from the Earth to a high earth orbiting base. Line 16 represents the energy for either soft landing that mass from L-1 or L-2 onto the Moon or for raising that mass from the Moon to either L-1 or L-2. Line 18 represents the small quantity of energy needed to move that mass from L-2 to a high earth orbiting base or from a high earth orbiting base to a low earth orbit crash satellite.

A significant advantage provided by the method and apparatus of this invention is the great saving in energy obtained by the practice of this invention. For example, with the expenditure of the energy represented by line 16 and twice that represented by line 18, it is possible to have a crash-load of lunar material transported to low earth orbit where, for a soft docking by current technology, energy equal to about a 160% as much would need to be expended. Likewise, items and materials from Earth and can be collision-transported to low earth orbit with the expenditure of energy represented by line 11 instead of the soft landing means which requires the quantity of energy as represented by line 12.

It should be noted that these lines of energy are not fully illustrative of the vast differences in cost and actual energies expended. Line 12 is representative of a rocket using at least two stages and the last stage is either not reusable or has weight added to the dead weight of the system by the use of wings. Also, the last stage uses hydrogen, which, because of its very low density and cryogenic temperature, requires a larger fraction of dead weight, while line 11 represents a one stage reusable rocket that could use a much denser and a cheaper fuel than hydrogen.

In accordance with one embodiment, items and materials are collision-transported from L-1 to the Moon. This requires a total expenditure by the practice of this invention of only the quantity of energy represented by the length of line 18, whereas by the current techniques of soft-landing energy equal to line 16 would be expended (without reuse of the landing means). If the soft-landing rocket is to be returned to L-1 with a cargo of lunar material equal in mass to the items and materials landed on the Moon, an additional quantity of energy equal to line 16 must be expended.

A large lunar base with many facilities is necessary for the practice of certain embodiments of this invention. Since it would be best if there were but one base area on the Moon, these embodiments are discussed herein with reference to a main base located close to the north pole of the Moon, and as close to the meridian that goes through the point on the Moon's surface nearest to the Earth as is possible, taking into account the need for communication with Earth and the recovery of water near the base. Note that a large mass-driver means located near the north pole of the Moon could be used to throw slugs of lunar material at a catcher located about the L-2 point.

Figure 4:
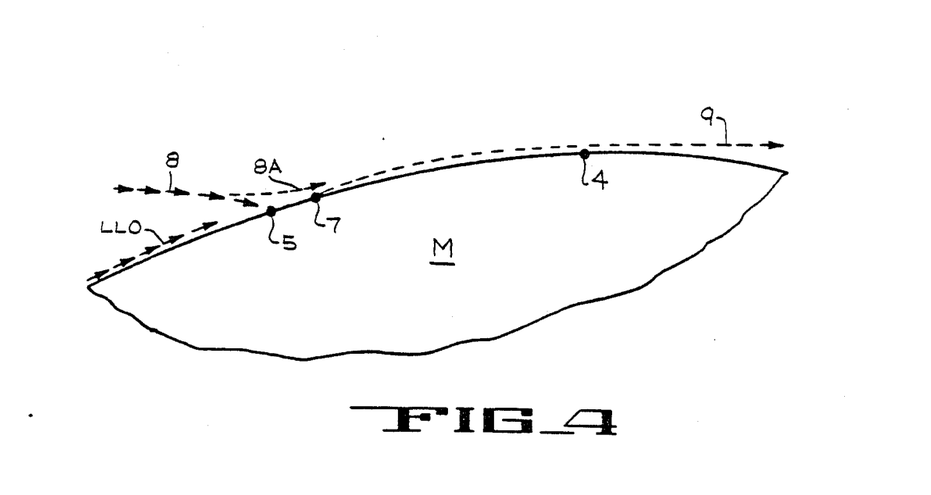
FIG. 4 is a fragmentary cross-sectional view of the north polar region of the Moon in the plane made by the center of the Moon, the north pole of the Moon, and the center of the Earth.

It should be understood that many different arrangements for the location of these different facilities are possible. A preferred location is illustrated in FIG. 4. With suitable orbiting communication satellites in high polar lunar orbits, a main base 5 could be located very close to the north pole 4 of the Moon M. Cargoes to be collision-landed on the Moon would follow a path shown as 8. The path of travel will be controlled by an adjuster rocket (not shown). Because of the location of base 5, the angle the path 8 makes with the surface of the Moon will be small and the energy needed to cause the adjuster rocket to avoid impact with the surface of the moon (as shown by path 8A) will be small. With a smaller angle of path 8 with the surface of the moon, the costs of construction for the crash-chamber would be less.

From a pure energy conservation point of view, the preferred location for the collision-chamber would be on the Moon's equator at the point furthest from the Earth. The path of a packaged-load from L-1 would be almost parallel to the surface of the moon at that point. Hence, the costs of construction would be much less and the energy needed for the adjustor rocket means would be much less. However, such a location for the main base would mean that water would have to be transported along the surface of the Moon a distance of over 2,500 km.

As is well known, a base on or about the point L-1 of the Earth-Moon system is almost stable. Thus, there is very little power and/or reaction mass needed to maintain a space facility about the L-1 point. The small push therefrom could cause a cargo-load to assume an orbit which would crash into the Moon along path 8 in FIG. 4. A quick push could cause the separated adjuster of the packaged-load to assume a path 8A which just misses the surface of the Moon and permits it to be returned to the facility for refueling and reuse. Note that additional energy is needed to cause the adjuster that is then along the path 8A to return to the L-1 facility. However, the total quantity of energy (meaning rocket fuel expended) for delivering the packaged-load into a corrected path 8 and for returning the adjuster back to L-1 is a small fraction of the energy needed to soft land the same quantity of cargo onto the surface of the Moon from L-1.

Recoverable impure iron exists in lunar soils and such impure iron could be easily procured by the use of electromagnets sweeping such lunar soil. Such impure iron contains some nickel and shall hereafter be called LIN from lunar-iron-nickel. LIN could be used in the construction of a lunar-based collision-chamber and could be a major export from the Moon.

Figure 5:
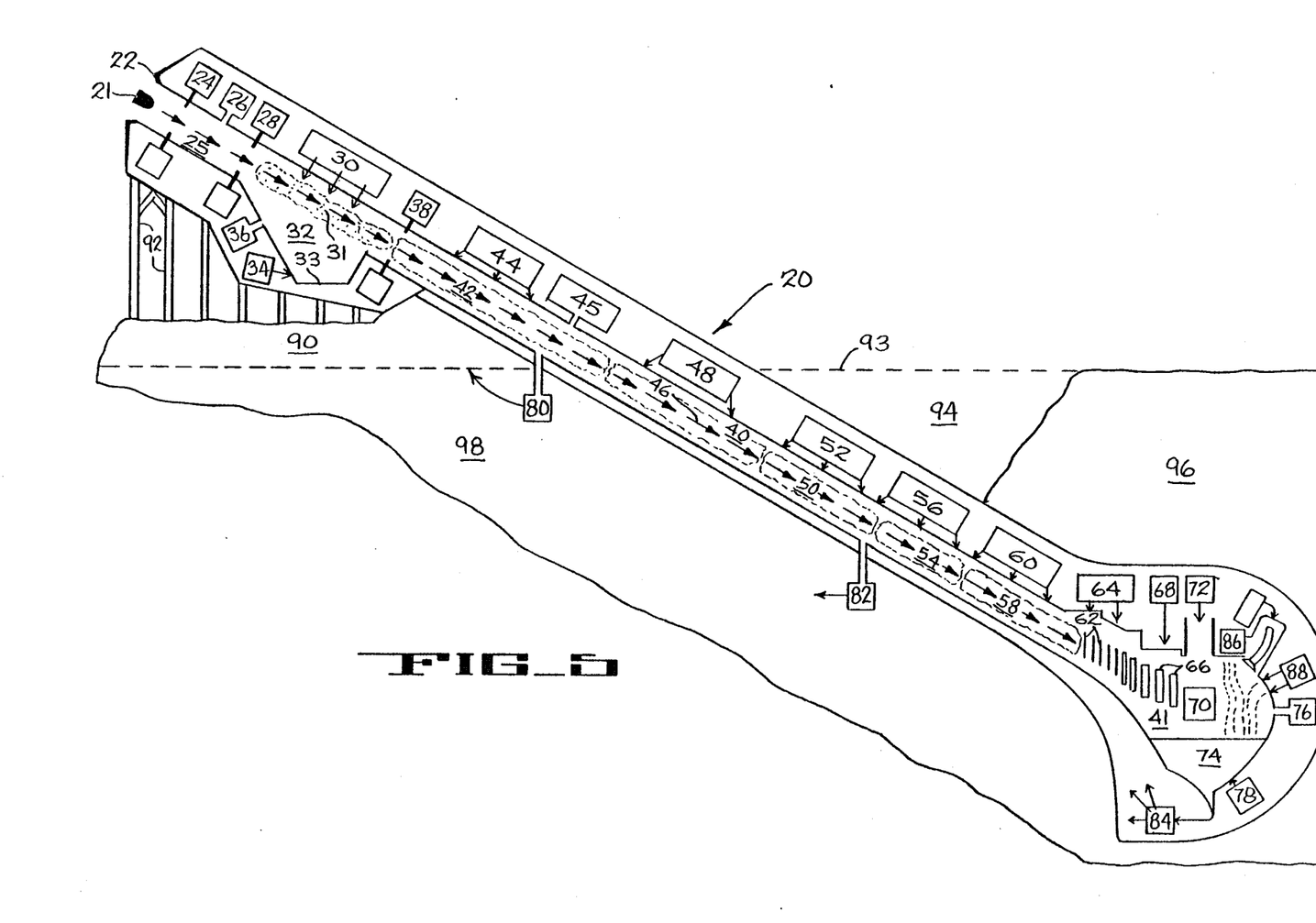
FIG. 5 is a somewhat schematic cross-sectional view of a long crash-chamber of this invention.

A preferred lunar-based collision chamber is illustrated in FIG. 5. FIG. 5 shows a long decelerating crash-chamber 20 which is constructed on the Moon at the terminus of path 8.

The chamber 20 preferably is significantly elongated and aligned to receive a packaged-load 21 traveling along the path 8 of FIG. 4. At the opening of the crash chamber 20, surrounded by protective bumpers 22, are a plurality of shutters, outer shutter 24 and middle shutter 28 defining an outer chamber 25. An inner shutter 38 and the middle shutter 28 define a middle chamber 32 therebetween, while an inner chamber 40 extends inwardly from the inner shutter 38 and has an end portion 41 of enlarged diameter.

The outer chamber 25 has a gas evacuation means 26 operably associated therewith which serves to substantially evacuate the outer chamber 25 before the outer shutter doors 24 are opened. Middle chamber 32 includes a dust dropping means 30 for dropping a cloud of sodium hydroxide dust 31 into the middle chamber 32 for absorbing water vapor within the chamber. An enlarged lower portion 33 of the middle chamber 32 also contains a dust gathering means 34 which collects the dust after it has been used to absorb the water in the middle chamber. Gas evacuation means 36 is positioned in the lower portion of the middle chamber 32 to remove gas therefrom before the middle shutter doors 28 are opened.

Inner chamber 40 is preferably in excess of 260 meters long and has the enlarged end portion 41. Positioned along the chamber 40 are a plurality of liquid delivering means which are configured to produce areas of fluid in ever-increasing density. A mist cloud forming means 44 is located near the shutter doors 38. Further along the chamber is a droplet cloud forming means 48 which is followed in turn by drop forming means 52, thin jet forming means 56 and stream forming means 60. Each of these consists of tanks and plumbing for holding quantities of a suitable fluid, preferably impure sodium hyroxide (containing enough water so that it is the liquid phase), for introduction in the path of an entering packaged-load 21. Suitable plumbing directs the fluid through the use of pumps not shown toward nozzles providing entry into the chamber 40 in a suitable form.

In addition, it should be noted that in my U.S. Pat. No. 4,344,913, issued Aug. 17, 1982, I disclose the use of spray streams which come from conduit openings which are on the order of decimeter in diameter and the use of finer sprays which come from nozzles which have openings which are on the order of a centimeter in diameter.

Also in the chamber 40 is an inner chamber gas evacuation means 45 for withdrawing gas from the chamber. Fluid entering the chamber flows down a lower portion thereof for removal through a suitable draining means 80 and 82. The fluid is then returned to the various forming means for storage and re-entry into the chamber in association with arrival with packaged-load 21.

In the end portion 41 of the inner chamber 40 are positioned a plurality of column-glob forming means for the purpose of interposing substantially contiguous masses of fluid in the path of the packaged-load 21 so that its motion will stop within the chamber. A thin column-glob forming means 64 releases very thin column-globs 62 into the chamber. A thicker glob forming means 68 releases thicker column globs 66 into the chamber. A large glob 70 is caused to be released for motion to the center of the inner chamber end portion 41 by large glob forming means 72.

Figure 5A:
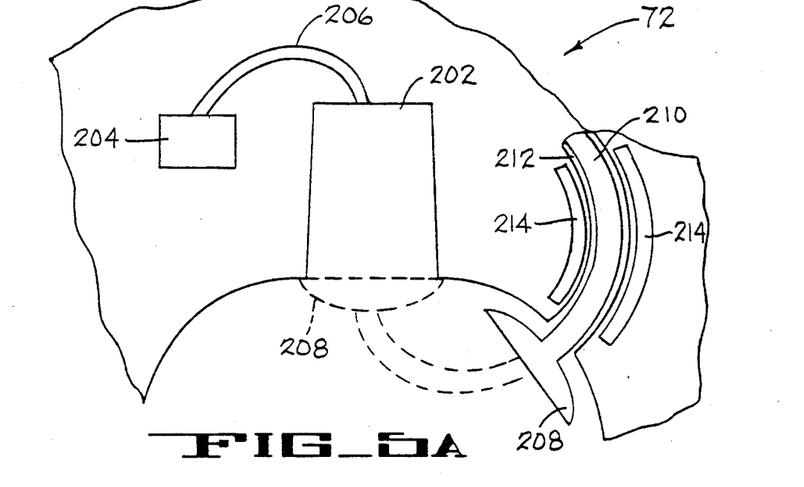
FIG. 5A is a fragmentary cross-sectional view of a column-glob forming means for use in the crash-chamber of FIG. 5.

Each of the column-glob forming means has a chamber for collecting fluid, a releaseable closure therebeneath and means for introducing fluid into the chamber. Such structure is described in more detail in my U.S. patent application Ser. No. 137,849, filed on Apr. 7, 1980 and entitled Large Contained Nuclear Explosion Breeder Reactor Systems and a preferred embodiment is illustrated in FIG. 5A wherein a chamber 202 is filled with fluid from a suitable fluid reservoir 204 through pipes 206 which should be provided in number and size to satisfy the time requirements for filling the chamber 202. A closure 208, shown in its retracted position in solid lines and in its closed position in dashed lines, seals the bottom of the chamber 202 to facilitate the filling of the chamber with fluid. At the instant that it is desired to release the column-glob, the closure is retracted. The closure may be of any suitable means which will provide sufficient speed of motion so that the column-glob can then fall freely and also has sufficient structural strength. In this embodiment, the closure has a shaft portion 210 which fits into a suitable opening 212 in the chamber wall and is moved between its retracting and closed positions by coils 214 forming the stator of a linear induction motor to magnetically move the shaft. Thus, retraction of the enclosure of the chamber 202 can be swiftly accomplished so that column-globs can be gravitationally released toward the desired point in the chamber to impact a packaged-load 21.

Referring again to FIG. 5, inner chamber end portion 41 also contains upper spray means 86 and end spray means 88 which serve largely to protect the walls of the chamber from damage which might occur from impact with debris separating from a cargo-load within the chamber. All of the liquid released into the chamber descends into a bottom pool 74 from which it is withdrawn by bottom draining means 84 for treatment and reuse.

A gas evaporation means 76 aids in the evacuation of the inner chamber and a packaged-load removal means 78 is positioned at the bottom of the chamber end portion 41 for extraction of packaged-loads from the chamber so that the contents thereof may be effectively used.

At the instant a packaged-load 21 enters the chamber 20, the plurality of means for causing rapid deceleration of the packaged-load 21 come into action. If a constant deceleration of $9,600/sec^2$ is maintained over a distance of about 300 meters, the time between entry and rest is about a quarter-second.

The plurality of deceleration means consists of the different "clouds" of matter into which the packaged-load collides. Such matter becomes increasingly denser until at the end the packaged-laod is slowed to a stop in a pool of impure sodium hydroxide.

At the mouth of the crash-chamber, the strong and thick bumpers 22 are provided to withstand a direct hit by a cargo-load which is off course without sustaining significant damage. Just before the packaged-load 21 enters the mouth of the cargo-chamber 20, the outer shutter doors 24 are opened. An instant later, the middle shutter doors 28 are opened. Between doors 24 and 28 is outer chamber 25 which is kept evacuated of gases by gas evacuation means 26. The purpose of chamber 25, which is about 15 meters long, is to prevent gas from escaping from the chamber 40.

The shutter doors 24 and 28 are only open for the instant that the packaged-load 21 is passing through. By having very fast acting shutter doors and by having extremely low pressure of gas within the chamber 25 (measurable in microns of mercury) the loss of matter (mostly water vapor) with each packaged-load will be on the order of a few grams of mass.

The working liquid in this crash-chamber is an impure sodium hydroxide that contains some water and potassium hydroxide and less quantities of other hydroxides and miscellaneous materials, most of which are in the form of minute insoluble particles. This impure sodium hydroxide is preferred because of its desirable properties and because of the ease and low cost of procurement on the Moon. However, different working liquids could be used. For example, a cool mixture of molten sodium and potassium would have a vapor pressure of almost zero.

About 30 meters inside of the shutter door 28 is the inner shutter door 38. Between the doors 28 and door 38 is a middle chamber 32 into which there is dropped a cloud 31 of dry cool impure sodium hydroxide dust. This dust is highly hygroscopic and will absorb most of the water vapor that is within the chamber 32.

The dust cloud 31 is dropped by dispensing means 30 and tends to collect on the bottom 33 of the chamber 32 which is somewhat bowl-shaped. Also for the chamber 32 there is a gas evacuation means 36. To collect the dust collected on the bottom 33 a collecting means 34 includes a door and remote controlled machinery to collect the dust. Suitable drying means (not shown) is used to dry the dust and return it to dispensing means 30 for reuse.

Inside of doors 38 is a long narrow inner chamber 40 which is preferably over 260 meters long having an enlarged end portion 41. The chamber 40 is to be aligned with path 8 and, during operation, receives a plurality of areas of fluid configured in ever-increasing density in the forms of clouds of mist 42, droplets 46, drops 50, jets 54, streams 58, thin column globs 62, and larger globs 66 and 70 of impure sodium hydroxide.

The large plurality of thin column-globs 62 preferably have a diameter of about a quarter-meter and a height of about 5 meters. The thicker column-globs 66, which are formed by the means 68, preferably have a thickness of about a meter and are about 6 meters high. The single large glob 70, which is formed in the glob forming means 72, preferably has a diameter of about 5 meters and a height of about 6 meters. The globs 66 and 70 are in the enlarged end portion 41 and fall to the bottom pool 74 after impact. Pool 74 preferably has a maximum depth of about 7 meters.

Before the packaged-load 21 enters the crash-chamber, the inner chamber pumping means 76 is used to reduce the gas and vapor pressure of the inner chamber to a level such that as little gas or vapor as is possible and practical escapes outwardly through the open doors 38. The temperature of the working liquid is preferably kept as cool and having as low a fraction of water as is practical.

After the packaged-load has impacted the progressively denser regions of liquid, it falls into the pool 74. Removal means 78 then extracts the packaged-load therefrom for conveyance to a facility outside of the chamber 40 for further use or handling, as required, in accordance with the nature of the packaged-loads. Also, the materials constituting the outer shell and the inner packaging are valuable sources of desired metals and/or substances.

The various sprays and column-globs introduced into the chamber during entry of a crash load causes the level of liquid in the pool 74 to rise significantly. Accordingly, within a few seconds after the packaged-load has stopped, the excess working liquid within chamber 40 is withdrawn by draining means through bottom draining means 80, 82, and 84 positioned along the inner chamber 40. The upper draining means 80 collects the liquid from the upper portion of the chamber 40. Such liquid is processed by means not shown and returned to mist cloud forming means 44 for reuse. Such processing includes cooling and dehumidifying in a well known manner. The middle draining means 82 does the same for liquid from the droplet cloud forming means 48 and drop forming means 52.

The bottom draining means 84 does the same for the forming means 56, 60, 64, 68, and 72, as well as for the upper spraying means 86, and for the end spraying means 88, in the inner chamber end portion 41. Note that such spray acts to attenuate much of the shock-blast effects from the load with glob collisions from in any way damaging the chamber's walls.

Most of the crash-chamber 20 is preferably made of LIN and the inner walls of the chambers have a thickness of 1 to 3 cm and contain many kilometers of conduits and many pumps (not shown). Chambers 25 and 40 preferably have a diameter of about 4 meters while the maximum diameter of the packaged-load is about one meter. That means that if the center-line of the packaged-load is along the center-line of the crash-chamber 20, the clearance on each side will be about 1.5 meters.

It is possible to provide a small amount of correction for deviation from the center-line by increasing the density of dust or liquid with increasing distance from the center-line. For example, at a given point on the center-line, the mass density is 40 grams per liter half a meter from the center-line the density would be about 45 grams per liter; a meter from the center-line the density would be about 50 grams per liter; and a meter-and-a-half from the center-line the density would be about 55 grams per liter. In order to get these approximate densities, the spray systems are so programmed to increase spray density with time such that at the instant the packaged-load arrives at that given point those densities exist in that region.

Probably the most exacting task is to get the path 8 to coincide with the center-line of the crash-chamber 20. After much calculation with the radars, control means, and packaged-load rocket control means, there could be practice runs made on a false target point to test the accuracy and reliability of the system without having to run the risk of the packaged-loads crashing into the outside portions of the crash-chamber 20. On the Moon there is no atmosphere, and thus, there are no irregularities, such as are present on Earth or Mars due to "weather".

Because the center line of the chamber 20 is not parallel to the surface of the Moon, about one-third of the chamber 20 system is built into an excavated, cave-like portion, about another one-third is under the surface level in a portion that has been excavated, and the balance is above the surface level and supported by resting on excavated material 90 and a plurality of structural members or posts 92. FIG. 5 shows the surface line 93 of the Moon and a portion 94 which has been excavated. The portion of the Moon which is above the end of the crash-chamber's end is shown as 96 while the rest of the moon is shown as 98.

Figures 6, 7:
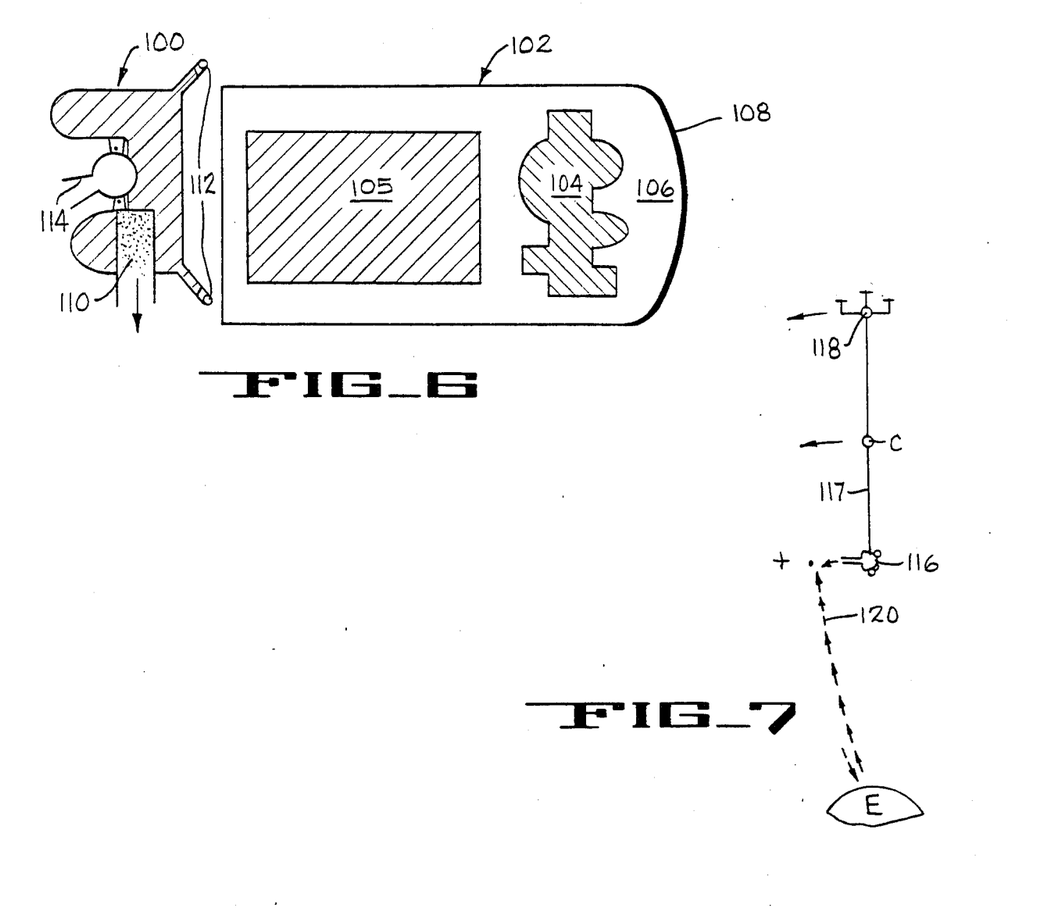
FIG. 6 is a somewhat schematic cross-sectional view of a rocket adjusting means and of a packaged-load in accordance with this invention.
FIG. 7 is a generally schematic diagram illustrating relative positions of the Earth, a low earth orbit crash satellite, and a counter-mass in accordance with this invention.

FIG. 6 shows a cargo-load rocket adjusting means 100 and a cargo-load 102 immediately after separation. Low density cargo 105 is preferably positioned behind high density cargo 104 while packing 106 consists preferably of useful materials. All are contained within a durable shell 108. The material of the shell 108 and the packing 106 are preferably of most useful materials that can be used on the Moon for fabrication into desired items, including such materials as aluminum-magnesium alloy, pure copper metal, specific plastics, and graphite. The front portion of the shell 108 should be much thicker than the sides and back portions. The shell 108, with the packing 106 tightly about the cargoes, must be of sufficient strength that the crash-load 102 does not burst or break up upon deceleration. By careful distribution and packing of the cargoes, no damage will result from that most rapid deceleration. The length of the packaged-load is preferably about 2 meters and its total mass is about 2 tonnes (metric tons).

The rocket adjusting means 100 is shown blasting quickly from path 8 into path 8A of FIG. 4 by the use of solid rocket means 110. Note that any suitable coupling means 112 may be used to secure the rocket adjusting means 100 to the cargo-load 102 from when they both leave L-1 until they separate. Coupling means 112 causes the separation to be such that the orientation and path 8 of the cargo-load 102 are unchanged as the rocket adjusting means 100 blasts away. Until that instant of separation, the rocket adjusting means 100 controls the path of travel and orientation of the packaged-load by use of its rocket motor 114.

The rocket motor 114 uses storable liquid fuels and operates to bring the rocket adjusting means 100 back to L-1. The use of a quick-acting solid fuel rocket 110 is preferred so that it is possible to control the packaged-load as long as possible. Thus, separation occurs very close to the surface of the Moon where only a quick firing solid rocket can provide the needed thrust quickly enough.

The practitioner of this invention might elect to have a rocket-launcher vehicle (not shown) which uses hydrogen and oxygen for placing the combination 100-102 almost into the correct path 8. Such a rocket-launcher means would blast off with combination 100-102 from L-1; place combination 100-102 into almost the correct path 8; separate therefrom; and return to L-1, all of which takes place in a couple of hours. The use of such a launcher vehicle permits rocket adjusting means 100 to be smaller and use much less storable fuel. The storable fuels will preferably include compounds of nitrogen and such nitrogen needs to be brought from Earth while hydrogen and oxygen might come from electrolyzed lunar or astroidal water.

By establishing a mass-driver on the Moon for returning objects from the Moon, it might be decided to make the shell 108 reusable. Possibly the shell 108 could be made mostly of separate pieces which are easily assembled into a cargo-load. Such pieces might be transported by mass-driving means to L-2. Note that it takes little energy to ship things from L-2 to L-1 although it does take some time.

FIG. 7 shows a low earth orbit crash satellite 116 in orbit some 200 km above the earth's equator. A counter-mass-base 118 is attached to the low earth orbit crash satellite 116 by a tether 117 which is preferably about 200 km long. This tether 117 could be somewhat tapered at its two ends to minimize the total mass of material needed for it to have sufficient strength. Shown as path 120 is the path that a packaged-load takes from Earth E to have a perigee at point X at the instant that the low earth orbit crash satellite 116 intersects point X. Point C is the center of mass and if 116 and 118 are of equal mass, then C is halfway between them. In other words, the point C is 100 km from both 116 and 118 and there is a net downward force or artificial gravity of about 0.4 newtons per kilograms of mass in the low earth orbit crash satellite 116.

The base 118 preferably will be active and consist of manufacturing facilities and solar energy collecting facilities. There is much less drag on base 118 due to very slight atmospheric gases than there is on the 200 km lower low earth orbit crash satellite 116. It is also possible that there be greenhouse facilities about base 118 that require much space and convert human wastes into food.

Figure 10:
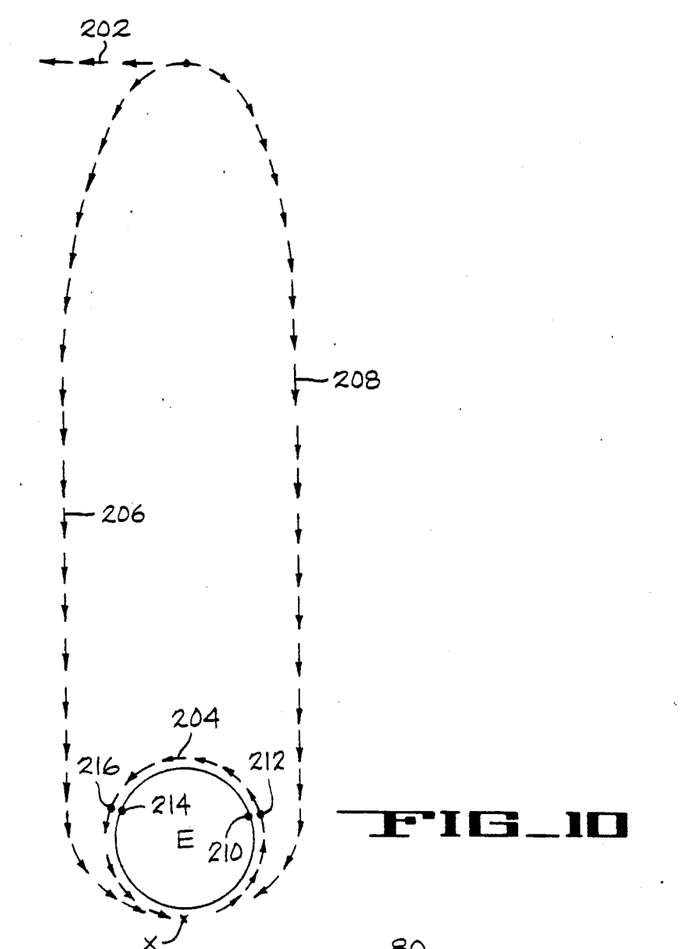
FIG. 10 is a generally schematic representation of earth orbits of satellites in accordance with this invention.

FIG. 10 shows the Earth E, the orbit 202 of a high earth orbiting base, and the orbit 204 of a low earth orbit crash satellite about the earth. The high earth orbit crash satellite has an orbital velocity of a few hundred meters per second. If a crash-load on a high earth orbit direction of orbit 202, the resulting velocity of the crash-load about the Earth is less than a hundred meters per second. Thus, the packaged-load falls downward toward the Earth in an orbit 206 that has a perigee that intersects at point X the orbit 204 at the instant the low earth orbit crash satellite is there.

At that instant of intersection, the velocity of the packaged-load is almost 3.2 km/sec faster than the velocity of the low earth orbiting crash satellite but in the same direction. Thus, there is a slight increase in the resulting velocity of the combination of the packaged-load and the low earth orbit crash satellite. On the other hand, when packaged-loads from the Earth are sent straight up from any point 210 to collision point 212 or from point 214 to point 216, the combination of the packaged-load and the low earth orbiting crash satellite will have a resulting velocity that is slightly less.

If a crash-load from the high earth oribiting base is given a velocity push in a direction opposite to orbit 202 such that the resulting velocity of the packaged-load is less than a hundred meters per second but in a direction that is opposite to orbit 202, then the packaged-load has a retrograde orbit 208. Since the packaged-load and the low earth orbit crash satellite, upon intersection, are traveling in opposite directions, the resulting combination will have a resulting velocity that is lower than the velocity of the low earth orbit crash satellite.

Note that by capturing such retrograde crash-loads, the velocity of orbit and the altitude of the low earth orbit crash satellite can be reduced. If the low earth orbit crash satellite is acting as a variable earth orbit crash satellite and has been raised by repeated captures of crash-loads in orbits like orbit 206 that low earth orbit crash satellite could be brought back to the lower low earth orbit crash satellite orbit by such retrograde packaged-load captures.

Figures 8, 9:
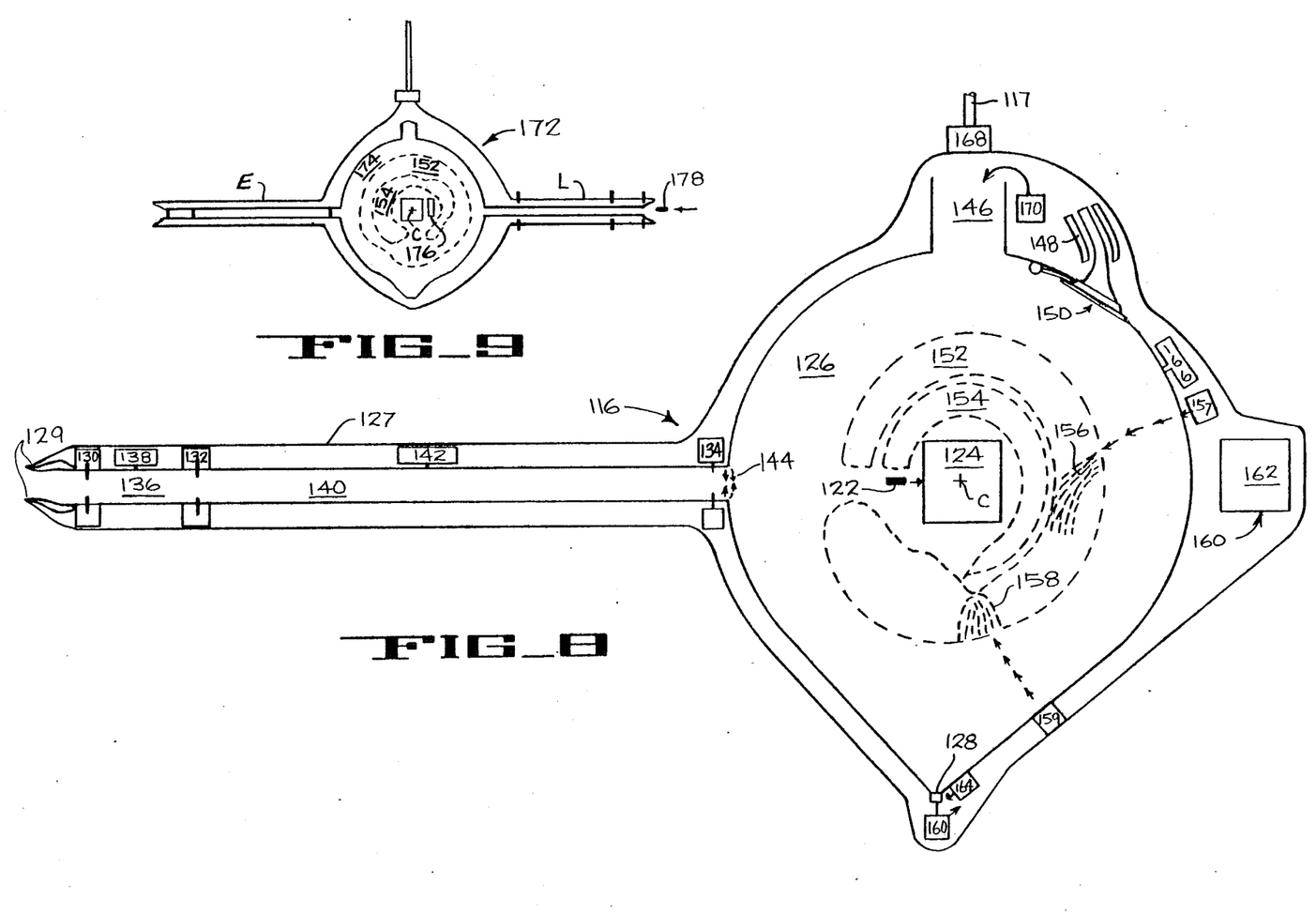
FIG. 8 is a generally schematic cross-sectional view through the center point of a low earth orbit crash satellite taken in the plane of its orbit.
FIG. 9 is a generally schematic cross-sectional view of an alternate embodiment of a low earth orbit crash satellite through the center point of, and in the plane of its orbit.

Satellite 116 is shown in more detail in FIG. 8 and is connected to tether 117 and has a generally pear-shaped chamber 126 and an elongated tubular portion 127 which has an opening at its extended end for receiving crash satellites therethrough.

Bumpers 129 protect the extended end 127 from damage which could otherwise be caused by misdirected crash-loads. Outer shutter doors 130 are positioned just inside the bumpers 129 and form with middle shutter doors 132 an outer chamber 136. A suitable gas evacuation means 138 is positioned at the outer chamber 136 to evacuate the chamber before the outer shutter doors are opened. Middle shutter doors 132 and inner shutter doors 134 form a middle chamber 140 which has gas evacuation means 142 provided therein. It is significant to note that the chamber structure of satellite 116 differs from the lunar based chamber 20 in that the plurality of spray regions of graduated density is not provided in these chambers.

At the periphery of chamber 126 adjacent to tether 117 is a glob forming chamber 146 which is provided with fluid by suitable filling means 170. A swinging plug 150 provides closure for the chamber, in the manner previously described for FIG. 5A, in association with suitable plug driving means 148. A gas evacuation means 166 is provided to reduce the pressure in the chamber 126 before opening inner doors 134.

In this embodiment, a crash-load 122 is stopped by impact with a massive centroid glob 124. Because there is virtually no deceleration of the crash-load prior to impact, means must be provided for protecting the walls and doors surrounding the chamber 126. Accordingly, suitable means are provided for interposing an area of spray 144 adjacent the shutter doors 134 for protection thereof. Additionally, spray regions 152, 156 and 158 are provided so that the walls will be suitably protected. A transport means 160 extracts materials from the chamber through suitable screen means 128 for transport to processing means 162. Screen cleaning means 164 is preferably provided to remove debris which collects on the screen 128.

The low earth orbit crash satellite 116 is illustrated with a crash-load 122 just about to impact a centroidal glob 124 which is at a center of the large end chamber 126. Chamber 126 is somewhat pear-shaped with side and upward radii of about 300 meters. The reason why the distance from center-point C of the chamber to a screen 128 at the bottom thereof is about 40 meters is that it is desired that the bottom sides of the chamber 126 have enough of a slope so that pieces of crash-loads do not remain attached to the sides but flow with the rest of the liquid slurry into or through the screen 128.

At the instant the crash-load 122 strikes the glob 124, large quantities of liquid are introduced by sprays and jets into the chamber 126. These are somewhat concentrated about the point C, so that the resulting explosion does not damage the containing walls. With a net downward force of about 4% per unit mass of what such a chamber would have on Earth, the rate of falling is much less and adhesive and cohesive forces become much more important.

At the entrance to the low earth orbit crash satellite 116, the bumpers 129 provide protection for the low earth orbit crash satellite from impact with a crash-load which may be sightly off its desired path. The bumpers 129 are thick and strong and have an entrance hole through their center of about three meters while the outer shutter-door 130 and middle shutter door 132 have entrance holes with diameters of about 4 meters. The inner shutter-door 134 has an entrance hole with a diameter of about 5 meters. These shutter-doors close and open as quickly as possible so that there is a minimum of gas or vapor lost therethrough from the chamber 126.

For a crash-load from earth, about 14 milliseconds pass from its passage through the outer shutter-door 130 until there is an explosion on impact with the glob 124 while with crash-loads from the Moon the period could be longer than 35 milliseconds. That means that there should be a minimum time that the shutter-doors are open and that the gas and vapor pressures within the chamber 126 are kept as low as practical by the use of impure sodium hydroxide that is cool and has a minimum of water therein.

Between the outer shutter-door 130 and middle shutter doors 132, the outer chamber 136 preferably is about 14 meters long. A very low gas and vapor pressure will be maintained in chamber 136 through the use of the gas evacuation means 138. Likewise between middle shutter-doors 132 and inner shutter-door 134, the middle chamber 140 is kept at a very low gas and vapor pressure by gas evacuation means 142. Chamber 140 preferably is about 120 meters long and tapered with a diameter of 4 meters near shutter-door 132 and a diameter of 5 meters near shutter-door 134.

Just inside the inner shutter-door 134 and inside the chamber 126, the plurality of very fast spray means produce fast spray 144 which must be timed so as not to interfere with the passage of the crash-load 122 but forms quickly enough to collide with much of the splatter from the collision explosion that would strike the closing shutter-door 134.

With the low earth orbit crash satellite 116, conditions are much different than with containment of large explosions on Earth with the use of column-globs. For example, a glob will free-fall about 4.9 meters the first second on earth and will free-fall but 0.2 meters in the low earth orbit crash satellite. That means that it takes over 14 seconds for the glob 124 to free-fall from glob-forming means 146 to the region about point C. There is plenty of time for the swinging plug actuating means 148 to have the swinging plug 150 move to and locking into a place along the upper wall of the chamber 126.

There are many crash-loads which could be captured by the low earth orbit crash satellite 116. If the crash-load does not contain materials like ammonia, water, or liquid hydrogen which will easily vaporize upon collision, there can be spray and jets in the path of the crash-load. However, in FIG. 8 is shown a configuration of spray and jets for the capture of a crash-load 122 containing materials, such as liquid hydrogen, ammonia ice, water ice in a plastic shell. A belt of fine spray 152 is outside an inner belt of jets 154. The jets could be from conduits with a diameter of about half a decimeter while the fine spray could be formed by nozzle means.

Spray 156 from spray means 157 is an example of spray 152 that comes from the side wall of the chamber. Spray 156 starts leaving the spray means 157 with a horizontal velocity of about 2 meters/second about 8 seconds before explosion and is turned off about 5 seconds before the explosion. Likewise, spray 158 from spray means 159 near the bottom of chamber 126 has an upward velocity of about 1.8 meters/second and a sideways velocity of about 0.8 meters/second starts about 12 seconds before explosion and stops about 6 seconds before explosion. By the use of a plurality of spray means, such as 157 and 159, it is possible to form a spray belt 152 at the instant of explosion.

The belt of jets 154 is formed in a similar way. Note that it is desired to have as much spray and jets as close to the center point C as is possible without striking the falling glob 124. Also, for this example, it is desired that there be a clear path for the crash-load 122.

After the collision-explosion, all of the shutter-doors are closed as quickly as possible and the debris of the explosion, and the liquids from the glob, sprays, and jets slowly fall towards the bottom. Such liquid slowly flows through the screen 128 into the transport means 160 which pumps such liquid to processing means 162. From the above crash-load there will be pieces of plastic which will be captured by the screen 128. Screen 128 is cleaned by a screen cleaning means 164 which removes such plastic pieces and any other debris from the screen for transport to the processing means 162.

With crash-loads of lunar material, pieces of LIN and lunar rocks may be captured in the screen. The liquid passing through the screen is a slurry containing pieces too small to be captured. Pump 160 slowly pumps this slurry to the processing means 162 for separation of desired materials and reuse of remaining liquid. Conventional and well known processing techniques may be used.

Almost all of the gases within the chamber 126 are collected into a plurality of gas evacuation means 166. Such gases include water vapor, ammonia, nitrogen, volatile hydro-carbons, and hydrogen. Nitrogen is transported from Earth because it is needed to create a breathable atmosphere, and for the production of storable fuels and oxidizer such as $N_2H_4$ and $N_2O_4$. Ammonia could be transported because it contains a higher fraction of hydrogen than does $N_2H_4$. On the other hand $N_2H_4$ could be transported from Earth for it has the advantage of having a lower vapor pressure than ammonia and is a better storable fuel. However, $N_2H_4$ is less stable than $NH_3$ and some of it will decompose upon crash-collision.

With different crash-loads there will be many chemical reactions with some of the materials due to the high localized heating due to the crash-collisions. For example, metals such as aluminum, magnesium and iron will react with water to produce oxides and free hdyrogen gas. Note that matter with a velocity of about 7,400 meters per second has kinetic energy per gram of about 6,500 gram-calories. However, when this material is mixed with the liquid within the chamber, the average rise of temperature of all such material is but a frew celsius degrees.

That means that the resulting slurry should be cooled in the processing means 162 or when the slurry is being stored for use in jets, globs, or sprays. This cooling will require much radiation piping, not shown, since in space the only way to cool is by the radiation of heat energy away from the low earth orbit crash satellite in a well known manner. At the top of the low earth orbit crash satellite is tether attaching means 168 by which the low earth orbit crash satellite 116 is attached to the tether 117. In order to maintain the altitude of the satellite 116 from becoming too high or too low, it is necessary to capture crash-loads entering from the front or direction opposite the velocity of the satellite and from the rear. This will cause changes in satellite velocity and thus satellite altitude as previously described. Suitable motors located in the tether attaching 168 may be used for rotation of the satellite which will permit it to change from a position in which it captures earth material crash-loads to capturing lunar material crash-loads. If sufficient precision of location cannot be provided through this means, a plurality of rockets (not shown) can be located near the bumpers 129 and used for fine control of the opening so that the likelihood of failure of a crash-load to enter through the doors 130 is minimized.

It may be preferred to ship dried materials, water, and other substances from the processing means 162 to the counter-mass-base 118 where electrolysis of water could be used for the production of hydrogen and oxygen, and other equipment used for the purification of LIN and the production of cables of LIN for tethering.

It is preferable that the low earth orbit crash satellite capture on the order of a hundred crash-loads of lunar material crash-loads before it is turned 180° to capture about a hundred crash-loads of earth materials, rather than turning about after every crash-load capture. As a result of the series of lunar material crash-load captures the altitude of the low earth orbit crash satellite will rise many kilometers and with the series of captures of earth crash-loads the altitude of the low earth orbit crash satellite will drop many kilometers.

To avoid the need for rotating 180° when changing from earth crash-loads to lunar crash-loads and vice versa, an alternate embodiment of low earth orbit crash satellite 172 is shown in FIG. 9 where there are narrow chambers on both sides of the main large central chamber 174, which is similar in structure to chamber 126. Both the chambers E and L are similar to the tubular portion 127 of FIG. 8 having similar bumpers and shutter-doors.

While crash-load 178 of lunar materials is entering the L chambers as shown in FIG. 9, the shutter doors of the E chambers are closed. Besides having a large centroidal glob 175 like glob 124 of low earth orbit crash satellite 116 low earth orbit crash satellite 172 has a plurality of thin small column globs 176. The configuration of globs, jets and sprays shown is for the crash-capture of a crash-load of lunar material that does not contain much volatile material. There is no need to have a clear path for the crash-load to the centroidal glob and there are a plurality of small thin globs 176 before the centroidal glob. Also, there is both some fine spray 152 and some jets 154 in front of the globs 176. Aside from the differences disclosed above, the operation of the low earth orbit crash satellite 172 preferably is like the operation of low earth orbit crash satellite 116.

The advantages of the low earth orbit crash satellite 172 is that it does not need to rotate 180° when it changes sources of crash-load materials; and if there is damage to either the chambers E or L, the low earth orbit crash satellite could still operate using the undamaged chamber.

A low earth orbit crash satellite may be operated as a variable earth orbit crash satellite to transport cargoes from low earth orbit to a higher orbit by capturing only lunar material crash-loads. The tethering method of creating a slight net downward force can be used for changes of orbit of many hundreds of kilometers without needing to increase the length of the tether. However, if it is desired to increase the altitude of the orbit several thousand kilometers, it would be necessary to greatly increase the length of the tether. Perhaps the best single reference for tethers is the long paper in April 1983 *Astronautics & Aeronautics* by Ivan Bekey titled "Tethers Open New Space Options".

To bring a variable earth orbit crash satellite that was at a higher low earth orbit down to a lower low earth orbit, there must be multiple captures of earth materials. Of course, it takes more energy to place a crash-load at 900 km altitude than it does to place it at 200 km, but still it is a small fraction of the energy needed to place it into orbit without the practice of this invention.

However, if it is desired to transport much cargo from low earth orbit to a much higher orbit, such as GEO, then the cost in energy needed for raising a crash-load of earth materials to an altitude grater than 20,000 km requires much more energy than placing the crash-load into low earth orbit, hence this variable earth orbit crash satellite needs some other means than the capture of earth material crash-loads for its return to low earth orbit from GEO.

It may seem costly and most burdensome to have a low earth orbit crash satellite or variable earth orbit crash satellite of roughly 40,000 tonnes total mass for the crash-load capture of but a 3 tonne crash-load of terrestrial water, plastic, ammonia, and liquid hydrogen, but it should be noted that there is a great saving in fuels expended and with the counter-momentum balancing velocity increasing captures of lunar material crash-loads of about 7 tonnes each there could be the total accretion of over 250 tonnes a day and upwards of 90,000 tonnes a year.

Note that with the capture of the 3 tonne crash-load with a velocity difference of about 7,400 meters per second, the low earth orbit crash satellite or variable earth orbit crash satellite loses about 0.555 meters per second of velocity while with the capture of the 7 tonne crash-load with a velocity difference of 3,200 meters per second the low earth orbit crash satellite or variable earth orbit crash satellite gains about 0.56 meters per second of velocity revolving about the Earth.

In the practice of this invention, the specific design of the decelerating-chamber and/or of the crash-containing low earth orbit crash satellite could be further improved by the use of thinner diameter long chambers such as chambers 136, 140, 25, and 40. With such thinner chambers be more accuracy in controlling the path of the crash-load is required, but there would be a great gain in the speed with which the shutters could be closed since the shutters would be much smaller. For example, if the diameter is reduced from 4 meters to 2 meters, the cross-sectional area of the shutter becomes only one-fourth as much. Note that with quicker shutters the loss of matter (mostly gases) becomes less with each cargo-load-capture.

The practitioner of this invention might elect to have disposable shutters for the chambers of this invention. For example, there would be strong shutters that close as quickly as possible after the collision-capture of the cargo-load. Note that after a cargo-load-capture, the gas and vapor pressures within the containing chamber are much higher than there are just prior to such capture. Such rise in gas and vapor pressure could be from roughly as low as 1 mm of Hg to over a 100 mm of Hg. Thus, the shutters that quickly close the chambers needs to be strong enough to withstand such higher pressures.

After the pressure within the containing chambers has been reduced to a couple mm of Hg or less, there could be placed across the narrow chambers very thin membranes of such materials as plastics and/or aluminum alloy that are able to withstand the very low pressure of said chambers. The incoming cargo-load crashes through such membranes. Note that the thickness of such membrane-shutters are, on the average, less than a millimeter and that most of the membrane-shutter remains in a torn condition after the crash-load has passed through it. Such membrane shutters should be designed so that the crash-loads cause a minimal size hole therethrough by reducing the tearing thereof.

Such membrane-shutters are withdrawn and the materials thereof are used to manufacture new membrane-shutters. The advantage of such membrane-shutters is that the chamber remains sealed until the crash-load breaks through the outside membrane-shutter whereas with reuseable strong shutters, there would be a loss of matter when the shutters are opened prior to the passage of the crash-load. Also, the opening therethrough is larger when the strong shutters are opened than is the hole blasted through the membrane-shutters and hence a greater loss of materials therefrom.

For return of a variable earth orbit crash satellite from a higher orbit to low earth orbit, it seems best that the use of crash-loads in retrograde orbit should be used. Such crash-loads could have a velocity relative to the variable earth orbit crash satellite of over 18 km per second and hence the skill of placing the crash-load into the precise location at the precise instant become more difficult. In addition, the retrograde orbiting crash-load contains much higher energy per kg of mass and hence the mass of such crash-loads for a given variable earth orbit crash satellite will be much less than for regular terrestrial or non-terrestrial crash-load captured by that variable earth orbit crash satellite and the glob, jets and spray alignments could be different.

When a variable earth orbit crash satellite is operating at altitudes greater than about $10^4$ km, the obtaining of a net downward force of enough magnitude by use of tethering becomes most difficult. The length and mass of the tether needs to be greatly increased; however, it should be understood that it is possible to have a low earth orbit crash satellite and/or a variable earth orbit crash satellite that does not have a long tethering means therein in at least two different ways:

The crash-containing chamber could be rotating about a center of gravity some 60 meters from its center point C with a velocity of about 5 meters per second. Hence, there would be a net outward force that is slightly greater than 0.4 newtons per kg of mass and the period of rotation is over 75 seconds.

It is possible that the crash-chamber could be operated without any net downward force and the working liquid be a pasty mixture of powdered LIN and impure lye. In such a free-fall condition, if the chamber's inner walls are of a non-magnetic material, such as aluminum alloy, the debris of crash-load collisions with a large centroidal glob and sprays will collect upon the walls mixed with the materials of the glob and sprays. There could be machinery that "cleans" such walls by use of powerful electromagnetic means and hence gathers in the liquid and solid materials to be used for the next crash-load containment.

Such a low earth orbit crash satellite using aluminum walls from spent rocket casings and having a working liquid that is mostly a paste of lye-LIN might be built and operated before the construction of the low earth orbit crash satellite disclosed herein.

Figure 11:
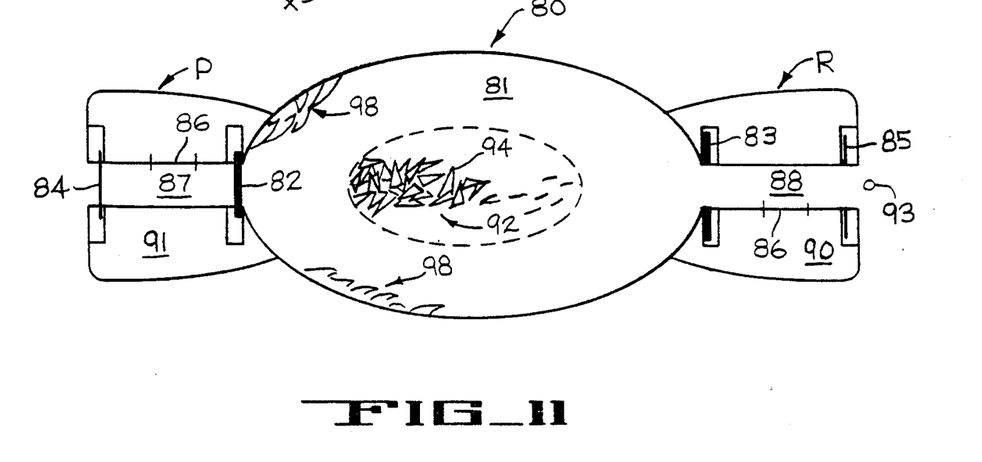
FIG. 11 is a generally schematic cross-sectional view of an alternate embodiment of a low earth orbit crash satellite in accordance with this invention.

Referring now to FIG. 11, a smaller, weightless, dual-opening and fluidless low earth orbit crash satellite 80 has a large ellipsoidal chamber 81 of major diameter of about 30 meters and of a minor diameter of about 20 meters. The walls of chamber 81 and of passageways 87 and 88 extending oppositely from extended ends thereof may be constructed of scrap meter from shuttle tanks or from expendable rockets that shipped supplies to low earth orbit. Since the chamber 81 is not designed to withstand gas and vapor pressures, there does not need to be the care of construction that is needed in the previous embodiments. However, the chamber 81 should be contained by walls strong enough to withstand the impact of heavy pieces of debris exploding outwardly.

Into this chamber 81 come crash-loads 93 from Earth through the passageway 88 and crash-loads of lunar material through the passageway 87. Note that the crash-loads from Earth are overtaken by the prograde traveling low earth orbit crash satellite and are hence de-facto retrograde in effect. Hence, that end R of the low earth orbit crash satellite is designated the retrograde end or portion of low earth orbit crash satellite 80. Likewise the prograde crash-loads of lunar material travel through the passageway 87 of the end P.

The low earth orbit crash satellite in FIG. 11 is shown as a crash-load 93 from Earth is just about to enter passageway 88. Note that the retrograde end's shutters 83 and 85 are open while the prograde end's shutters 82 and 84 are closed. The inner shutters 82 and 83 are massive and strong so that they can withstand impacts from heavy pieces without damage. As soon as crash-load 93 passes it, the outer shutter 85 starts to close so that very little debris ever escapes out of the low earth orbit crash satellite 80. The outer shutters are light in mass and are much faster acting than the inner shutters.

Although the low earth orbit crash satellite 80 could be made gas and vapor tight and somewhat converted to a gas and vapor capturing facility, this low earth orbit crash satellite 80 can be operated as a "dry" crash-load capturing low earth orbit crash satellite. The material of the crash-load of lunar origin could include lunar soil and/or impure iron grains. Much of the upper portions of the lunar surface contain from 2% to 5% grains of LIN. Such grains can be easily gathered up by powerful electromagnets. The material of the crash-loads from Earth could include water-rich compounds such as dry LiOH and $B(OH)_3$, as well as other desired materials.

Opening onto the passageways 87 and 88 are a plurality of trap-doors 86 through which equipment and personnel or robots enter to assemble the scrap-pile 96 and to remove into the portions 90 or 91 materials so collected. This "cleaning up" and "fixing up" of the chamber 80 could be done by many different kinds of machines and in many different ways. For example, if the crash-loads from earth contain much LiOH and the crash-loads mixed with fine grains of plastic of lunar materials contain a large proportion of loosely cohering grains of impure lunar iron equipment having many small electro-magnets, there will be gathered up much iron as grains that has much dust of plastic and LiOH adhering thereto. For this type of operation to succeed, it is the walls of chamber 80 should be constructed aluminum or some other non-magnetic materials.

If alternate crash-loads of plastic-LiOH and iron grains are used, electro-magnet sweepings can gather much more iron grain. Remaining in the chamber 80 will be large quantities of LiOH-plastic that will adhere to the walls and "scrap-pile" pieces. By fine gentle electro-magnet sweeping, more and more LiOH-plastic will be gathered up. To further illustrate a possible situation: If the "dust" thereabout is 90% LiOH-plastic and but 10% iron grains with a gentle electro-magnetic sweeping four/fifths of the iron grains and but a tenth of the LiOH-plastic is gathered up, there will be more LiOH-plastic gathered up than iron grains (9 to 8).

Including a large fraction of the volume of the inner portion of the chamber 81 is a crash-pile 92 which is made up of a lot of loose pieces from previous crash-loads and broken pieces of large scrap-pieces. An average scrap-piece 94 may have a length of 10 to 15 meters and a width of about a meter with a plurality of holes punched therein. These holes could have a diameter of a centimeter and be about a couple centimeters from an edge. They are used for connecting scrap-pieces together. Thin wire of aluminum can be used since there needs to be very little strength therein. The scrap-pieces preferably are cut from the discarded fuel tanks of the shuttle.

This embodiment uses a large crash-pile 92 assembled about the middle of the chamber 81. Crash-pile 92 preferably has a volume of about two hundred cubic meters of which over 80% is at a near-vacuum. In an ultra-micro-gravity environment within the chamber, just the outer pieces need to be tied or connected together and those outside tied pieces can contain thousands of untied pieces with all kinds of debris thereabout.

Hooks may be built into the wall of the chamber 80 wall to which many scrap-pieces are tied as are shown as wall-scrap assembly 98. The purpose of such assembly 98 is to protect the walls from damage which could otherwise result from impact by higher velocity scrap-pieces.

After a crash-load 93 strikes the pile 92, the pile is reassembled to be struck by another crash-load from either passageway 87 or 88. The appropriate shutters are opened or sealed shut and the pile 92 and the assemblies 98 are so prepared. While almost all the scrap pieces are loose, the outer scrap-pieces are sufficiently secured so that the pile 92 remains in about the desired location and with the desired configuration for the few minutes that the equipment and/or personnel are leaving the chamber 81 and traveling out through the trap-doors 86.

A LiOH-plastic crash-load of 320 kg at a relative velocity of about 7.4 Km/second balances (momentumly) an iron-grains crash-load of 740 kg at a relative velocity of about 3.2 km/second. The low earth orbit crash satellite 80 could crash-capture more than its own mass in a few months and such materials and fuels therefrom could be used to build a low earth orbit crash satellite as previously described herein, to send more supplies to the other bases on the Moon and far satellites, or to construct larger low earth oribt facilities.

The materials captured are processed in processing facilities 91 in prograde end P and in processing facilities 90 in retrograde end R. Such processing will preferably include removal of water from the LiOH and converting the plastic dust into usable fuels. Also, the iron can be made into useful forms and other materials could be separated out for needed use.

The low earth orbit crash satellite 80 will be provided with rockets or other suitable orientation means (not shown) so that the passageways 87 or 88 can be kept in the required alignment to receive crash-loads therethrough without damage.

It is believed that there are asteroids that come much closer to earth than does Mars and such asteroids contain compounds of carbon and that there are other asteroids that are rich in nickel, cobalt, and platinum metals. Materials from such asteroids might be used instead of lunar materials for crash-loads from high earth orbit transfer satellites to a low earth orbit crash satellite.

There are many items, such as food, equipment, and supplies, that could withstand deceleration on the order of a thousand times gravity and thus could be much more cheaply transported from Earth to low earth orbit than by some soft docking means. However, if it desired to have a long decelerating-chamber in a satellite in orbit about the Earth and the crash-cargoes come straight upward with no horizontal velocity, rough calculations show that the total length of the crash-chamber needs to be nearly 3 km.

It takes only one-fourth the energy to obtain a velocity that is equal to one-half the orbital velocity and with such a system the length of crash-chamber needs only to be one-fourth as long as or about 740 meters. For the packaged-cargoes of such a system, the delivery means could include air breathing ram-jets and/or scram-jets that are reuseable.

Thus, with the practice of this invention, a large long crash-chamber could be constructed in low earth orbit for the capture, by deceleration of cargoes having partial orbital velocity resulting from a delivery system using air for the burning of a majority of its fuel. Of course such a cargo-catching satellite system would also capture prograde cargoes of lunar materials so that the system roughly maintains its low earth orbital altitude.

Such a cargo-catching satellite system could be constructed where there is a very long decelerating chamber that is attached to a separate large crash-chamber for containing crash-loads of lunar materials. In fact, it is possible to have three separate chambers (a very long decelerating chamber for packaged loads from Earth, a crash-chamber for volatile crash-loads from Earth with gas separating means, and a crash-chamber for non-volatile crash-loads of lunar material) attached to each other all in a single cargo-catching satellite system.

Also, it is possible that packaged loads from Earth that contain volatile materials could be so packaged and precooled that they could be successfully transported through a deceleration chamber without the packaged cargo leaking out.

There could be a crash-cargo system where there is a balance of crash-loads of lunar materials in highly elliptical orbits that are normal to the plane of the equator half coming over the Earth's north pole and half coming over the Earth's south pole. Such a system could also capture prograde crash-loads. Likewise, that system could capture balanced crash-loads that are prograde but inclined to the Earth's equator.

It should be noted that a low earth orbit crash-satellite could capture both prograde and retrograde crash-loads of lunar material and maintain a substantially stable and constant orbit. With a high frequency of crash-loads and with a working liquid, such as molten sodium, much of the kinetic energy of such crash-loads could be converted into useful thermal energy by the use of heat exchanging means. For every gram of such crash-load material captured, there is an average of more than 7,000 gram-calories of energy available. Since the after-capture temperature of the working liquid should be in excess of 200° C. to obtain a reasonable conversion of kinetic energy into thermal energy, the materials used in the construction of the large crash-load capturing and containing chamber needs to be able to maintain its strength at such temperatures. LIN that is used for slightly thicker walls would prove to be satisfactory.

A major problem, but one which could be resolved, is the separation of the captured lunar material from the working liquid. Most probably the working fluid would be a dense slurry of mostly powdered lin in molten sodium. By the use of centrifuges and/or the use of the tethered produced "gravity", such lin could be separated from most of the sodium. By heating us such recovered LIN, the slight quantity of sodium remaining could be distilled off and hence recovered. Of course the ideal lunar material to be used in such a system where there is the desired to obtain useful thermal energy would be sodium itself.

Also, a crash-containing satellite could be constructed in a geo-stationary orbit that captures lunar materials from high earth orbit crash satellites in both prograde and retrograde orbits such that it maintains somewhat constant altitude. Such captured material could be used for the construction of solar power satellites, communication and broadcasting facilities, and other desired uses.

It should be noted that the cargo capture-containing facilities of this invention could be on some other natural planetoids or satellites than the Earth's Moon and that it could be located on some man-made satellite that orbits the Moon or Mars.

It will be readily apparent from the foregoing Specification that modifications may be made of the extraterrestrial transportation systems and methods disclosed therein without departing from the spirit and scope of this invention.

I claim:

1. A method of transporting a cargo with a mass in excess of 10 kg over a distance greater than 10 km from a transmitting location to an extraterrestrial receiving location where the average total density of gases and vapors along the final 10 km of transported distance is less than one gram per cubic meter, said method comprising the steps of:
   propelling said cargo from said transmitting location along a path toward said receiving location such that said cargo arrives near said receiving location with a relative velocity to said receiving location that is in excess of 600 meters per second;
   providing a receiving facility at said receiving location having an opening aligned with at least a portion of said path and providing access to an impact chamber having a volume in excess of ten cubic meters, said receiving facility having at least one shutter in the path of said cargo which opens prior to the approach of said cargo and closes less than a second after said cargo enters said impact chamber;
   introducing material into said impact chamber for interacting with said cargo such that relative velocity of said cargo with respect to said chamber is reduced to zero without significant damage to said chamber, the average total density of vapors and gases within said impact chamber just prior to said cargo interacting with said material being less than 100 grams per cubic meter; and
   removing said cargo from said impact chamber.

2. The method of claim 1 wherein the step of introducing material comprises positioning an assemblage of solid materials to be impacted by said cargo.

3. The method of claim 1 wherein the step of introducing materials comprises introducing quantities of liquid into said impact chamber including at least one substantially coherent mass of liquid, and timing the introduction of said liquid to cause said mass to be positioned in the path of said cargo when said cargo enters said impact chamber.

4. The method of claim 1 wherein said cargo becomes fragmentized upon impact and mixes with materials in said impact chamber, including the step of separating said cargo fragments from said impact chamber and the impact chamber materials.

5. The method of claim 4 wherein said cargo fragments include vapors and gases.

6. The method of claim 4 wherein said cargo fragments dissolve into or become chemically associated with said impact chamber materials.

7. The method of claim 1 wherein the material that is introduced into said impact chamber includes a slurry whose principal ingredient is impure sodium hydroxide.

8. The method of claim 1 wherein the material that is introduced into said impact chamber includes a slurry which contains very small scraps of spent rockets.

9. The method of claim 1 wherein the material that is introduced into said impact chamber includes a slurry whose principal ingredient is impure molten alkali metal.

10. The method of claim 1 wherein said cargo is so packaged that it is able to change from a relative velocity that exceeds 600 meters per second to a relative velocity of zero in a long impact chamber without any appreciable damage to said cargo.

11. The method of claim 1 wherein said receiving facility is located upon the Moon.

12. The method of claim 1 wherein said receiving facility is located upon a man-made satellite that is orbiting the Earth.

13. The method of claim 12 wherein said man-made satellite that is orbiting the Earth contains a plurality of said receivng facilities.

14. The method of claims 12 or 13 wherein said man-made satellite maintains a substantially constant circular orbit about the Earth by receiving, at different times, cargoes from the Earth whose relative velocity to the Earth's center is much less that the relative velocity of said satellite and cargo of mostly extraterrestrial material whose path is in a highly elliptical orbit about the Earth and whose velocity relative to the center of the Earth is much greater than said cargo-receiving satellite.

15. The method of claims 12 or 13 wherein said man-made satellite maintains a substantially constant circular orbit about the Earth by receiving at different times cargoes that are mostly of extraterrestrial material such that the vector sum of the moments of said cargoes is generally zero relative to the momentum of said satellite.

16. The method of claims 12 or 13 including the transporting of cargoes of lunar materials to said satellite having a substantially circular orbit about the Earth with an orbital radius that is less than 50,000 kilometers, and including the steps of:
   transporting said cargo to a location that is more than 500,000 kilometers from the Earth;
   propelling said cargo into a highly eliptical orbit about the Earth; and
   adjusting said eliptical orbit so that said cargo travels through an opening into the said impact chamber of said satellite.

17. The method of claim 12 including the transporting of terrestrial materials to a satellite having a substantially circular orbit about the Earth with an orbital radius that is less than 10,000 kilometers, and including the steps of:
   propelling said cargo upwards from the Earth with a much greater vertical velocity component than horizontal velocity component; and
   adjusting the path of said cargo so that said cargo travels through an opening into the impact chamber of said satellite.

18. The method of claim 1 wherein said introduced material is substantially a liquid, and the step of removing said cargo from said impact chamber includes the withdrawal from said impact chamber of molecules or fragments of said cargo, such removal from said impact chamber being substantially by liquid flow that is produced by gravity or psuedo-gravity.

19. A method of transporting a cargo from a transmitting location to an extraterrestrial receiving location, said method comprising the steps of:
   propelling said cargo from said transmitting location along a path toward said receiving location;
   providing a receiving facility at said receiving location having an opening aligned with at least a portion of said path and providing access to an impact chamber;

introducing material into said impact chamber for interacting with said cargo such that relative velocity of said cargo with respect to said chamber is reduced to zero without significant damage to said chamber; and withdrawing from said impact chamber molecules of said cargo that are in the gas or vapor phase, such removal from said impact chamber being substantially done by the movement of gases from a warmer impact chamber with a higher vapor pressure to external chambers that have lower vapor pressures and are somewhat cooler.

20. The method of claim 19 wherein said removal is aided by the use of pumps.

21. The method of claim 20 wherein said cargo includes water and said removal is aided by the use of deliquescent materials in adjacent external chambers.

22. A method of transporting a cargo from a transmitting location to an extraterrestrial receiving location, said method comprising the steps of:

propelling said cargo from said transmitting location along a path toward said receiving location;

providing a receiving facility at said receiving location having an opening aligned with at least a portion of said path and providing access to an impact chamber;

introducing material into said impact chamber for interacting with said cargo such that relative velocity of said cargo with respect to said chamber is reduced to zero without significant damage to said chamber; and removing said cargo from said impact chamber including the use of powerful electro-magnets that collect ferro-magnetic cargo materials and additional cargo materials that are attached thereto.

23. A method of transporting a cargo from a transmitting location to an extraterrestrial receiving location, said method comprising the steps of:

propelling said cargo from said transmitting location along a path toward said receiving location;

providing a receiving facility at said receiving location having an opening aligned with at least a portion of said path and providing access to an impact chamber;

introducing material into said impact chamber for interacting with said cargo such that relative velocity of said cargo with respect to said chamber is reduced to zero without significant damage to said chamber;

removing said cargo from said impact chamber; and obtaining useful thermal energy from the interaction of said cargo with material introduced into said impact chamber.

24. An extraterrestrial facility for receiving cargo with a mass in excess of 10 kg and a relative velocity to said facility that exceeds 600 meters per second as said cargo arrives near said facility, said facility being in an extraterrestrial location where the average total density of gases and vapors is less than one gram per cubic meter, and reducing the relative velocity of said cargo to zero without significant damage to said facility, said facility comprising:

an impact chamber with a volume in excess of 10 cubic meters and having an opening for receiving said cargo;

at least one shutter in the path of said cargo which opens prior to the approach of said cargo and said shutter closes less than a second after said cargo enters said impact chamber;

means for the introducing of material into said impact chamber prior to the entry of said cargo for interacting with said cargo for reducing the cargo's relative velocity to zero and for preventing damage to the impact chamber's walls; and means for removing materials from said chamber for the withdrawal of said cargo, including the withdrawal of gases and vapors such that the density of such gases and vapors within said impact chamber are less than 100 grams per cubic meter just prior to arrival of subsequent cargo, from said impact chamber and for the reintroduction of material into said impact chamber.

25. The facility of claim 24 wherein said facility is constructed on a man-made satellite which orbits the Earth.

26. The facility of claim 24 wherein said facility is constructed on a natural satellite.

27. The facility of claim 24 including at least one disposable shutter in combination with at least one re-useable shutter for said opening through which said cargo travels, said disposal shutter comprising a thin membrane of strong material for containing gases with a vapor pressure of a couple of millimeters of pressure and rupturing upon impact of a cargo, the diposable shutter retaining most of its structural integrity except in the area through which said cargo travels.

28. The facility of claim 25 wherein said facility is attached at one end to a substantially vertical tether with a length roughly of the order of $10^5$ meters, said tether being attached on its other end to at least one mass having a total mass on the order of the mass of said facility.

29. The facility of claim 25 wherein said facility rotates about a center of mass that is between $10^2$ and $10^4$ meters from the center of the said facility's impact chamber and with a period that is between twenty and a thousand seconds.

30. A method of decelerating a cargo packaged so as to be able to change from a relative velocity exceeding 600 meters per second to a relative velocity of zero in an impact chamber whose length along its center-line is in excess of a hundred meters, said length being more than ten times the maximum diameter of said impact chamber, said method including the steps of introducing material into said impact chamber, and controlling the density of said material such that at the instant of said cargo interaction with said material the density of said material along said center-line is less than the density of said material near said center-line, and the density of said material near said center-line is less than the density of said material further away from said center-line.

31. The method of claim 30 wherein the density of said material along said center-line which is introduced into said impact chamber at the instant of said cargo interaction becomes greater as said relative velocity decreases.

32. The method of claim 12 wherein said man-made satellite has freight secured thereto.

33. The method of claim 32 wherein said man-made satellite changes its orbit by receiving seriatim cargo whose relative velocity is in the same relative direction.

* * * * *